United States Patent [19]

Iwasa

[11] Patent Number: 5,058,710
[45] Date of Patent: Oct. 22, 1991

[54] ELEVATOR POWER SOURCE DEVICE

[75] Inventor: Masao Iwasa, Ichikawa, Japan

[73] Assignee: Otis Elevator Company, Farmington, Conn.

[21] Appl. No.: 567,422

[22] Filed: Aug. 14, 1990

[51] Int. Cl.⁵ ............................................... B66B 1/30
[52] U.S. Cl. .................................... 187/114; 187/119; 318/807
[58] Field of Search ............................. 187/114, 119; 318/807–811; 363/34, 37

[56] References Cited

U.S. PATENT DOCUMENTS

| | | | |
|---|---|---|---|
| 4,503,938 | 3/1985 | Nomura | 187/119 |
| 4,516,665 | 5/1985 | Watanabe | 187/114 |
| 4,548,299 | 10/1985 | Nomura | 187/119 X |
| 4,554,999 | 11/1985 | Kamaike | 187/114 |
| 4,666,020 | 5/1987 | Watanabe | 187/114 |
| 4,779,709 | 10/1988 | Mitsui et al. | 187/119 |

*Primary Examiner*—Todd E. Deboer
*Assistant Examiner*—W. E. Duncanson, Jr.
*Attorney, Agent, or Firm*—Francis J. Maguire, Jr.

[57] ABSTRACT

A simplified elevator power system using an AC-DC converter, both to convert AC to DC during normal operation and to convert stored DC power to AC during power failures. A power source monitoring relay monitors AC power coming from a utility, and upon power failure, switches a battery from a charging mode to a power source mode wherein DC power is supplied, not only to an inverter for driving a motor, but also to a converter hooked up to run as an inverter during such power failure in order to provide stepped-up AC voltage to elevator control devices. In this way, the prior art addition of an extra inverter is avoided.

3 Claims, 2 Drawing Sheets

ELEVATOR POWER SOURCE DEVICE

TECHNICAL FIELD

This invention relates to electric motive power systems for elevators and, more particularly, to such systems utilizing auxiliary power.

BACKGROUND ART

An elevator power source device may include a speed control unit which receives a power supply from a commercial power source and which can adjust the commercial utility line frequency at will for controlling the speed, and may further include an emergency power supply unit which provides power when the power supply from the commercial power source is stopped, e.g., during power failure. This invention concerns this type of elevator power source device.

FIG. 2 shows a conventional elevator power device of this type. In FIG. 2, a power source monitoring relay 1 is connected to power lines (three-phase, 200/400 V) for providing fixed frequency power from the commercial power source. An AC-DC converter 2 has its input side connected to the commercial power lines and is used for providing DC. A DC-AC inverter 3 has its input side connected to the DC output side of the AC-DC converter 2 and provides AC for controlling an elevator motor 4. A set of batteries 5 is connected to the output side of AC-DC converter 2 via a set of normally closed contacts (which will be closed, i.e., short circuited, during power failure and otherwise open) of power source monitoring relay 1. A battery charger 6 is connected to the power lines via normally open contacts (which will be closed under normal conditions and open circuited during power failure) of power source monitoring relay 1. A DC-AC inverter 7, which, together with a step-up DC reactor (DCL) and a switching unit S connected to it, form an emergency power generating device.

AC reactors ACL are connected to prevent a current surge on the input side of AC-DC converter 2 for controlling the elevator motor and the output side of DC-AC inverter 3. A large-capacitance capacitor C is connected to the input side of DC-AC inverter 3 for controlling the motor. In this way, a voltage source that can guarantee a constant voltage is formed.

The operation is as follows. When the commercial power is supplied, the AC-DC converter 2 supplies DC power to capacitor C on a DC link. The DC link power is converted to AC power with a variable frequency by the DC-AC converter 3. This frequency-variable AC power is supplied to motor 4, which is driven with its speed controlled. For this power supply system, when motor 4 is driven mechanically by the elevator system's counterweight, it can act as a generator with the electrical power generated by it fed back to the power source side. With the power feedback system, the operation efficiency can be improved.

In addition, the commercial power is also used as the power for the elevator control device, and it is used for open/close control of the elevator door, operation of signal device, etc.

In using the commercial electrical power, battery charger 6 always charges battery 5.

During power failure, by a make/break operation of the related contacts NP of power source monitoring relay 1, AC-DC converter 2 and battery charger 6 are cut off from the power lines, and battery 5 is connected via the DC link to the DC-AC inverter 3 for controlling the motor. With the aid of the power supplies from battery 5, the driving of motor 4 is continued until the cage reaches the nearest story. The power from battery 5 is supplied to the elevator control devices via the emergency power generating device, so that there is no break in the control operation.

Although such a conventional elevator power system can certainly operate satisfactorily, it nevertheless uses three sets of converters and inverters. Among them, two sets 2, 7 are not used during normal power supply or in power failure. The design efficiency is therefore poor. This is a cost problem.

DISCLOSURE OF INVENTION

The object of the present invention is to provide a type of elevator power system having a simplified structure.

According to the present invention, an AC-DC converter is used both to convert AC to DC during normal operation and to convert stored DC power to AC during power failures.

In further accord with the present invention, an elevator power system comprises a power source monitoring relay connected to the power lines supplying power from a commercial power source, an AC-DC converter which has its input side connected to said power lines, a DC-AC inverter which has its input side connected to the output side of said AC-DC converter and is used to control a motor, a set of batteries which is connected to the output side of said AC-DC converter via normally closed contacts (open circuited during normal operation but closed during power failure) of said power source monitoring relay, a battery charger which is connected to said power lines via normally open (during power failure) contacts of said power source monitoring relay, In still further accord with the present invention, a step-up transformer is connected to the input side of said AC-DC converter via normally closed (during power failure) contacts of said source monitoring relay, and which generates a control voltage for elevator control devices.

In still further accord with the present invention, a switch circuit is responsive to said power source monitoring relay for providing control signals to the transistors of the AC-DC converter in the absence power failure so that said AC-DC converter operates as an AC-DC converter, and for providing control signals to the transistors of said AC-DC converter during power failure so that said AC-DC converter operates as a DC-AC inverter.

These and other objects, features and advantages of the present invention will become more apparent in light of the following detailed description of a best mode embodiment thereof, as illustrated in the accompanying drawings.

BEST MODE FOR CARRYING OUT THE INVENTION

Figure 1:
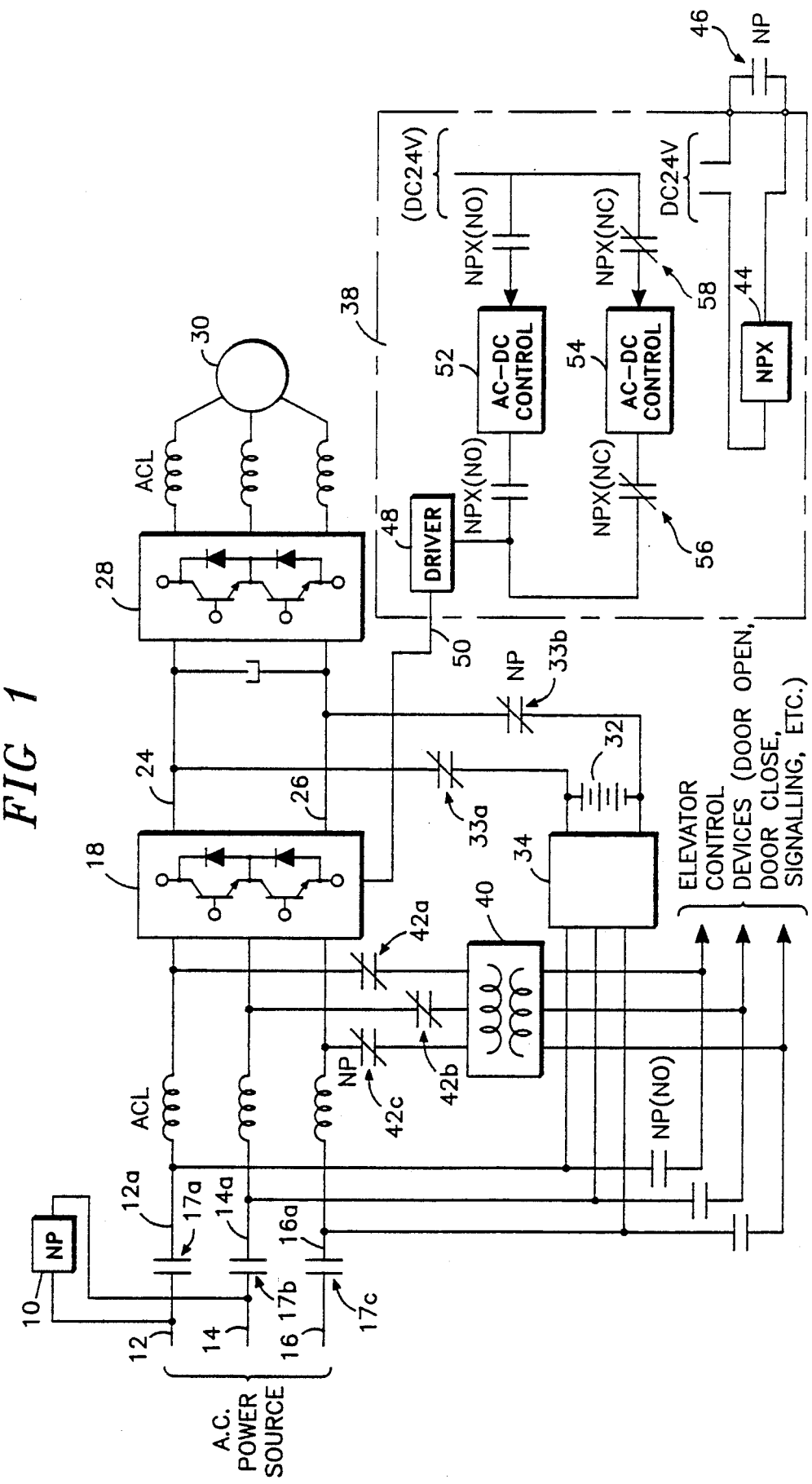
FIG. 1 is a circuit diagram of an elevator system having backup power arranged according to teachings of the present invention.
Figure 2:
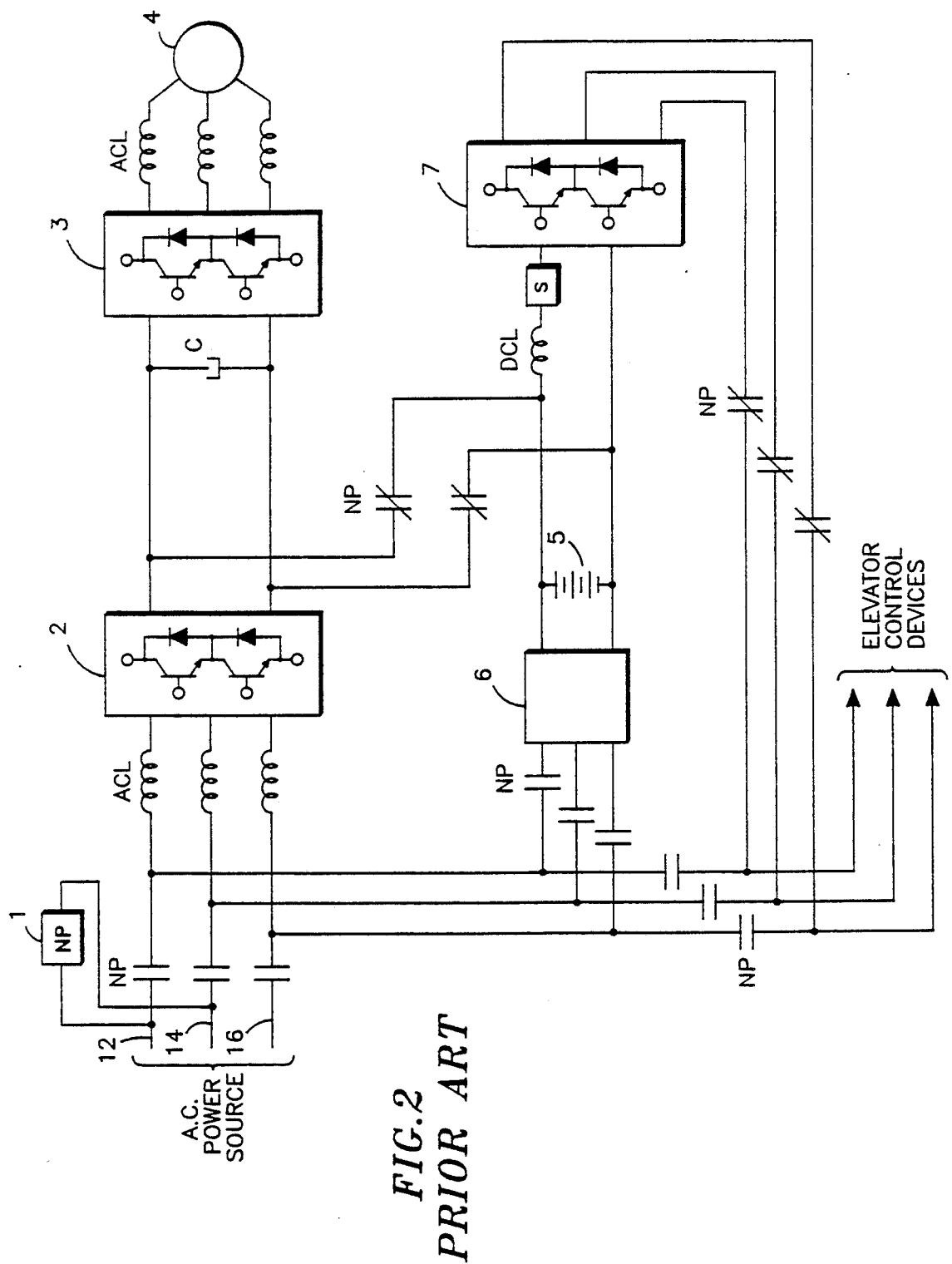
FIG. 2 is a circuit diagram of a prior art backup power arrangement.

FIG. 1 shows a preferred embodiment of the present invention. A power source monitoring relay 10 is connected to two power lines 12, 14 of three power lines 12, 14, 16 for supplying three phase power from a commercial utility power source to an AC-DC converter 18 having its input side connected to power lines 12a, 14a, 16a through normally open contacts 17a, 17b, 17c of relay 1 and through AC reactors (ACL) and having its output connected to a DC link 24, 26. A DC-AC inverter 28 is connected to the DC link 24, 26 and provides AC for controlling a motor 30. A battery 32 is connected to the DC link via a pair of normally closed (open circuited during normal operation and closed during a power failure) contacts 33a, 33b of the power source monitoring relay 1. A battery charger 34 is connected to AC power lines 12, 14, 16 via contacts 17a, 17b, 17c (during normal conditions) of power source monitoring relay 1. A conversion switch circuit 38 provides control signals to device 18. A step-up transformer 40 is connected to the input side of the AC-DC converter 18 via normally closed (during power failure) contacts 42a, 42b, 42c of the power source monitoring relay and generates the elevator control voltage for the elevator control devices. Much of the the explanation for the structural elements which are the same as those in the power source device shown in FIG. 2 will not be repeated here.

Conversion switch circuit 38 is connected to power source monitoring relay 1 and AC-DC converter 18. Conversion switch circuit 38 comprises a power source monitoring auxiliary relay 44 connected to a normally open (closed during normal power supply and open-circuited during a power failure) contact 46 of power source monitoring relay 1, a transistor driving circuit 48 for providing control signals on a line 50 to AC-DC converter 18, an AC-DC converter control circuit 52 for use during normal operational condition of the utility power supply and connected to a power source, e.g., DC 24 V, and an AC-DC converter control circuit 54 for use during power failure for providing control signals on the line 50 via the transistor driving circuit 48 via a pair of normally closed (during power failure of auxiliary relay 44) contacts 56, 58.

When power is supplied from commercial power lines, conversion switch circuit 38 has its AC-DC converter control circuit 52 for normal power supply connected to the device 18 via normally open contacts NPX (NO) of power source monitoring auxiliary relay 44, and transistor driving circuit 48 controls the transistors of device 18 so that it operates as an AC-DC converter. In this case, the operation of the device shown in FIG. 1 becomes identical to the operation of the device shown in FIG. 2. Now, let us look at the operation of the device shown in FIG. 1 in the case of power failure.

During power failure, conversion switch circuit 38 has its AC-DC converter control circuit 54 for the case of power failure connected to the 24 V DC power source via normally closed contacts NPX (NC) of power source monitoring auxiliary relay 44, and transistor driving circuit 48 controls the transistors of device 18 so that device 18 operates as a DC-AC inverter. On the other hand, during power failure, battery 32 supplies power to DC-AC inverter 28 for controlling the motor via the normally closed contacts 33a, 33b (during power failure), and drives motor 30. At the same time, battery 32 supplies DC power to AC-DC converter 28 via the contacts 32a, 32b (during power failure); the AC voltage converted from said DC power under the control of conversion switch circuit 38 is stepped up to the normal AC control voltage by step-up transformer 40 via the contacts 42a, 42b, 42c (during power failure), and is supplied to the elevator control devices.

As explained above, while a conventional elevator power source device requires three sets of converters or inverters, the power source device of this invention only has two sets, which operate without interruption in both normal power supply state and during power failure. In this way, the structure of the power source device can be simplified by the design teachings of the present disclosure, which can be used with a higher efficiency in this case.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. An elevator power source device comprising:
   a power source monitoring relay connected to power lines supplying AC power from a commercial power source;
   an AC-DC converter which has its input side connected to said power lines;
   a DC-AC inverter which has its input side connected to an output side of said AC-DC converter and is used to control a motor;
   a battery connected to said output side of said AC-DC converter via contacts (in the case of power failure) of said power source monitoring relay;
   a battery charger which is connected to said power lines via contacts (in the case of power failure) of said power source monitoring relay;
   a step-up transformer which is connected to the input side of said AC-DC converter via contacts (in the case of power failure) of said power source monitoring relay, and which generates an elevator control voltage; and
   a converter switch circuit which is connected to said power source monitoring relay and said AC-DC converter, which controls the transistors of said AC-DC converter without power failure so that said AC-DC converter operates as an AC-DC converter, and which controls the transistors of said AC-DC converter during power failure so that said AC-DC converter operates as a DC-AC inverter.

2. Apparatus for use during a primary power failure in a motor drive having an AC to DC converter, a DC link, a DC to AC inverter, means for sensing AC provided to an AC port of said AC to DC converter for providing an AC failure signal in the presence of a primary power failure and means for providing stored DC to said DC link in response to said failure signal, comprising:
   means, responsive to said failure signal, for providing a first control signal to said AC to DC converter in the absence of said failure signal; and
   means for providing a second control signal to said AC to DC converter, in response to said failure signal, for providing AC at said first port.

3. A method for use during a primary power failure in a motor drive having an AC to DC converter, a DC link and a DC to AC inverter, comprising the steps of:

sensing AC provided to a first port of said AC to DC converter for providing an AC failure signal in the presence thereof;

providing stored DC to a second port of said AC to DC converter connected to said DC link, in response to said failure signal; and providing a control signal to said AC to DC converter, in response to said failure signal, for providing AC at said first port.

* * * * *